3,199,438
COMBINED ADJUSTABLE BROILER PAN
ASSEMBLY AND ROTISSERIE
George W. Myler, Emmaus, and Robert A. Clark, Allentown, Pa., assignors to Caloric Appliance Corporation, Topton, Pa.
Filed Jan. 24, 1961, Ser. No. 84,562
7 Claims. (Cl. 99—421)

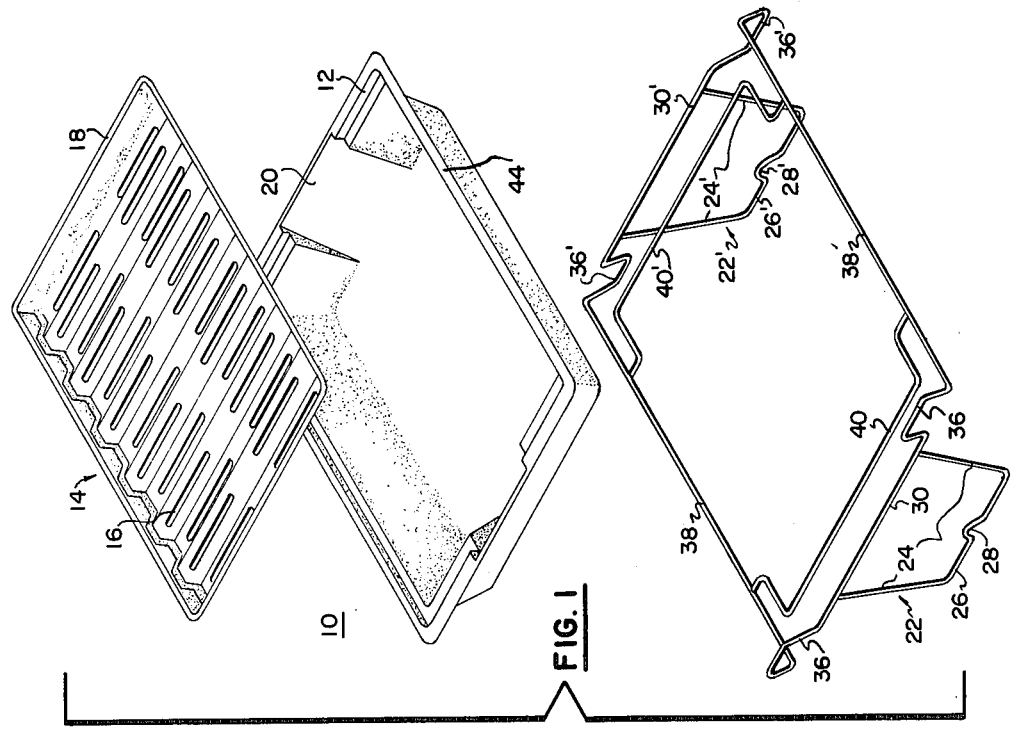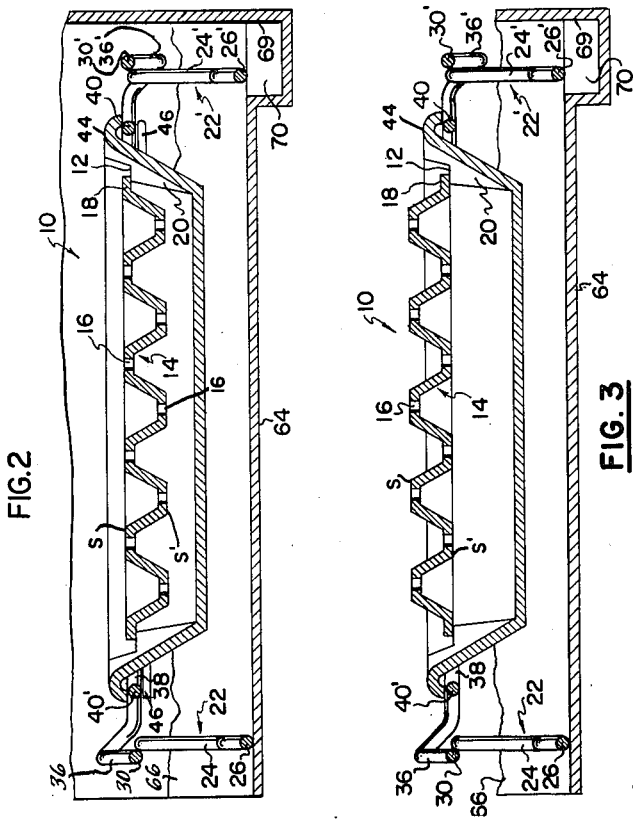

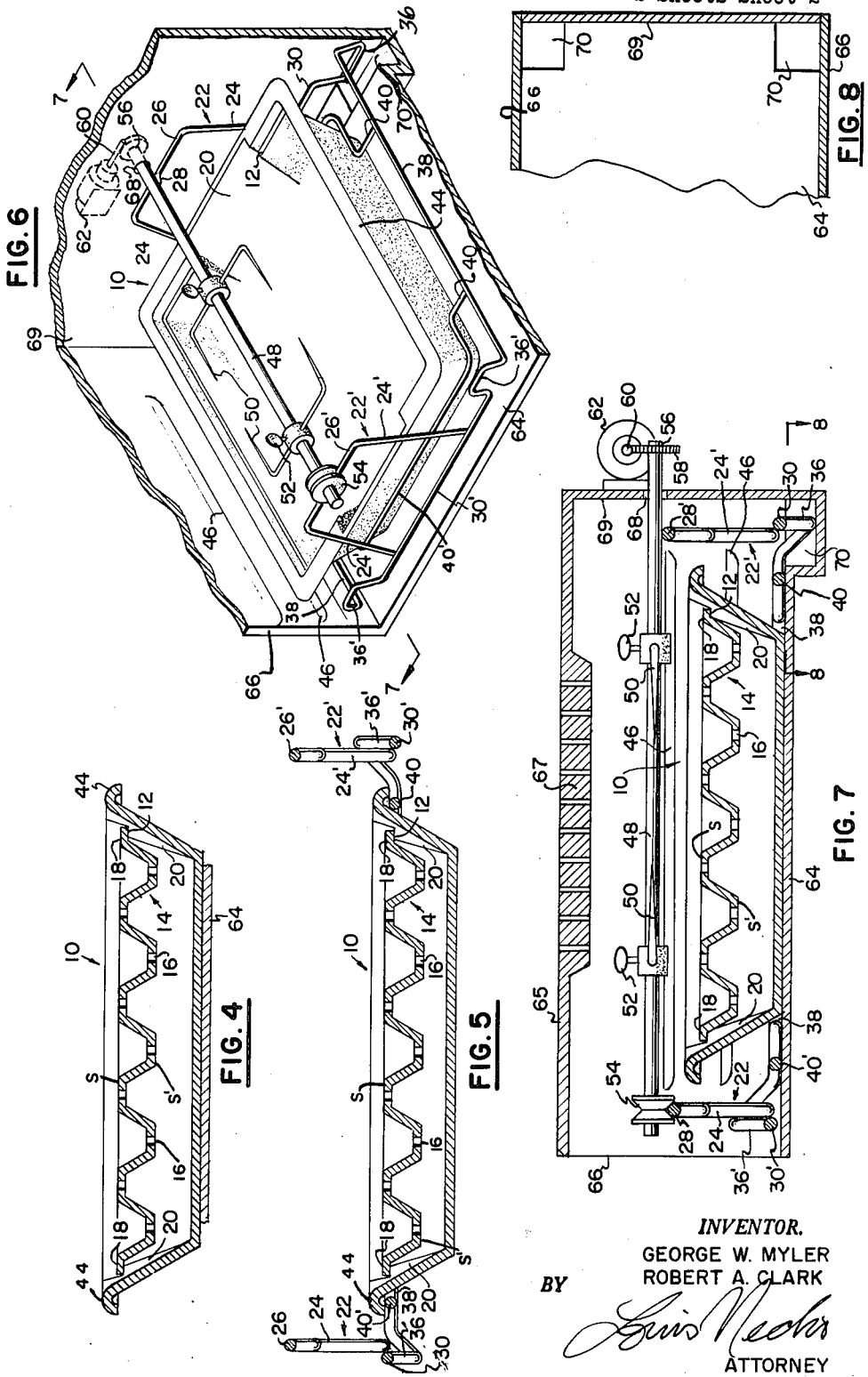

This invention relates to a combined adjustable broiler pan assembly and rotisserie and is a continuation-in-part of our application, Serial No. 691,965, filed October 22, 1957, now abandoned, entitled "Combined Adjustable Broiler and Rotisserie."

Ordinary cooking stoves are provided with an oven compartment, a broiler compartment therebelow, and a heating element carried by the top of the broiler compartment, which is also the bottom of the oven compartment, for heating the broiler and the oven compartments.

The broiler compartment also includes a rear wall, side walls, and a bottom wall for supporting the food to be cooked below the heating element. The open front end of the broiler compartment is closed by a door hinged to the front of the stove. For convenience, a drawer formed of side walls and a bottom wall is usually positioned in the broiler compartment and the food to be cooked is placed on the bottom wall of the drawer instead of on the bottom wall of the compartment.

Some foods must be cooked quickly and therefore must be brought closer to the heating element, and vice versa.

One object of this invention is to produce a widely adjustable broiler pan assembly whereby the food to be cooked can be positioned at a large number of different distances from the heating element.

A further object of the invention is to produce a construction in which the adjustable support of the broiler pan assembly can be used to help convert the broiler compartment into a rotisserie.

A still further object is to produce a construction which is simple, durable, easy to install and remove and easy to clean.

The full nature of the invention will be understood from the following specification and the accompanying drawings in which:

FIG. 1 is an exploded, perspective view of a broiler pan assembly embodying the invention.

FIG. 2 is a longitudinal, vertical sectional view showing the parts of FIG. 1 assembled in a portion thereof.

FIG. 3 is similar to FIG. 2, but showing a different adjustment.

FIG. 4 is similar to FIG. 2, but omitting the wire stand shown at the bottom of FIGS. 1 to 3 to show still another adjustment.

FIG. 5 is similar to FIG. 4, but showing how the wire stand of FIG. 1 may be used as a carrier for the broiler pan and tray of FIG. 4.

FIG. 6 is a fragmentary perspective view showing the use of the parts shown in FIG. 1 for supporting a rotisserie.

FIG. 7 is a sectional view looking in the direction of line 7—7 on FIG. 6.

FIG. 8 is a sectional view looking in the direction of line 8—8 on FIG. 7.

As shown in FIG. 1, the broiler pan assembly includes a pan 10 having an internal peripheral ledge, or seat, 12 for receiving the margins 18 of a tray 14 which is preferably corrugated to provide widely spaced, parallel food supporting surfaces S and S', each of which is provided with drain slots 16. Seat 12 is disposed inwardly of the rim 44 of the pan and is interrupted to provide finger holes 20 to facilitate manipulation of tray 14.

If it is desired to achieve maximum distance between the food on food-supporting tray 14 and heating element 67, which is carried by top wall 65 of the broiler compartment, pan 10 is placed on the bottom wall 64 of the broiler compartment and tray 14 is so positioned as to depend into the pan, as shown in FIGS. 4 and 7 in which flange 18 of the tray rests on seat 12 and the surface S of the tray is below rim 44 of the pan. If it is desired to bring the food a bit closer to heating element 67, which may be a gas burner, or an electric heater, pan 10 remains on bottom wall 64 of the broiler compartment, or broiler drawer, if a drawer is used, but tray 14 is inverted so as to occupy the position shown in FIG. 3 in which flange 18 again rests on seat 12, but the food supporting surface S of tray 14 is higher than the rim 44 of pan 10.

In order to provide for further elevation of the food toward the heating element, we provide the wire stand shown in FIG. 1. This stand includes bails 22 and 22', which serve as legs in the positions of FIGS. 2 and 3, and as lifting handles in FIG. 5 and as rotisserie supports in FIGS. 6 and 7. Bails 22 and 22' are formed of converging arms 24 and 24' and cross arms 26 and 26'. Bails 22 and 22' are carried by end arms 30 and 30' which are bent to form hooks 36 and 36', which are interconnected by side rails 38 and 38' and which are hereinafter referred to. Near their ends, rails or arms 38 and 38' are connected by braces 40 and 40'.

To bring tray 14 still closer to the heating element, the wire stand referred to is inverted from the position shown in FIG. 6 and is placed in the position shown in FIGS. 1, 2 and 3 in which cross arms 26 and 26' rest on the bottom 64 of the compartment and in which braces 40 and 40' engage the rim 44 of pan 10 to support the pan at a distance above bottom 64 of the broiler compartment. As shown in FIGS. 2 and 3, tray 14 may be disposed below, or it may project above the rim of, the pan to provide two adjustments relative to the heating element without moving the pan relative to the burner.

To provide additional adjustments of the food relative to the heating element, the side walls 66 of the broiler compartment, or of the broiler drawer if a sliding drawer is used, are provided with horizontally disposed vertically spaced ribs 46 which are adapted to be engaged by side arms 38 and 38' of the wire stand to support said stand and the pan carried thereby, at the desired height above bottom wall 64. It will also be noted that when the wire stand may be supported by any pair of ribs 46 and tray 14 may be positioned relative to the pan, as shown in FIG. 2, or as shown in FIG. 3, so as to give two additional adjustments.

The cross arms 26 and 26' of the wire stand are provided with notches 28 and 28' for receiving one, or more, pulleys 54 which are carried by shaft 48. The inner end of shaft 48 is adapted to pass through opening 68 in the rear wall 69 of the broiler compartment, detachably to engage a gear 56 which is driven by the worm shaft 60 of a motor 62 which is located in the compartment which contains the usual insulation material. It will be understood that the other walls of the compartment are also insulated, but since it has nothing to do with the invention, the insulation has not been shown. Shaft 48 is provided with conventional movable prongs or clamps 50 which are held in position by set screws 52.

To convert the broiler compartment to a rotisserie, it is merely necessary to reverse the wire stand from the position of FIG. 1, to engage pulley 54 with notch 28, and to insert the inner end of shaft 48 through opening 68 into engagement with gear 56 so that when the gear is rotated by motor 62, shaft 48 will also turn.

The weight of the meat on shaft 48 tends to resist rotation and creates a thrust which tends to displace the stand. To prevent such displacement, the bottom wall 64 of the compartment is provided with openings 70 which are engageable with hooks 36 and 36' formed at the junction of side rails 38 and 38' with cross brace 30 and 30' as best shown in FIGS. 6, 7 and 8.

From FIGS. 5 and 6 it will be seen that the wire stand can remain in the oven compartment even when it is not in use. This is due to the fact that this area of the bottom wall of the pan is smaller than the area of the opening defined between side rails 38, 38' and braces 40, 40'. This permits the pan to rest on the bottom 64 of the oven compartment, the same as if the wire stand had been removed. It will, however, be noted that if the wire stand is raised, braces 40, 40' will engage the under side of rim 44 of the pan so that the wire stand now serves as a pan lifting device instead of as a support as in FIGS. 2 and 7.

What we claim is:

1. For use within a compartment having a bottom wall and a heater above said wall,
   a pan insertable into said compartment and having a bottom wall, side walls and end walls, said walls terminating in a rim,
   said pan having a seat formed inwardly of and below said rim,
   and a tray carried by said pan and including:
   a body portion and a peripheral flange of a size to be engageable with said seat,
   the thickness of said flange being less than the distance between said rim and said seat,
   said body portion being corrugated to provide two discontinuous, parallel, planar food-supporting surfaces, one of which is in the plane of said flange and the other is in a plane spaced from and parallel to the plane of said flange, the distance between said planes being greater than the thickness of said flange, both of said surfaces being below the rim of said pan when one side of said flange is resting on said seat, and one of said surfaces being below said rim and the other of said surfaces being above the said rim when the other side of said flange is resting on said seat.

2. The structure recited in claim 1 and a stand insertable into said compartment and including:
   parallel side rails, end rails spaced apart a distance less than the length of said pan whereby said end rails engage the underside of said rim to support said pan and a pair of vertical legs carried by said end rails for supporting said end rails and said pan above bottom wall of said compartment.

3. The structure recited in claim 2 in which the ends of said legs remote from said side rails are connected by horizontal members which are bent in the direction of said side rails to provide notches adapted to rotatably support a shaft when it is disposed transversally of said members.

4. The structure recited in claim 1 in which said flats are perforated.

5. The structure recited in claim 2 in which said pairs of legs are spaced apart a distance greater than the length of said pan and said side rails are spaced apart a distance greater than the width of the bottom of the pan, whereby, when said side rails rest on the bottom wall of the compartment with said legs pointing upwardly, said pan can be placed on said bottom wall between said side rails and said legs with the rim of the pan overhanging, but not engaging, said side rails, or said legs, and whereby, when said legs rest on said bottom wall, the rim of said pan is engageable with said side rails to support said pan above the bottom wall of the compartment at a distance substantially equal to the length of said legs.

6. In combination,
   a broiler compartment including a bottom wall providing a first supporting surface in one plane and a second supporting surface in another, downwardly offset plane, the junction of said first and second planes providing a shoulder,
   a stand in said compartment for supporting a rotating object and comprising a flat portion adapted to rest on said first supporting surface and a pendant portion adapted to rest on said second surface and to engage said shoulder to prevent withdrawal and wobbling of said stand in response to the torque exerted by the rotating object supported by said stand.

7. For use in a broiler compartment, or the like, in combination:
   a pan having a rim and a seat disposed below, and inwardly of said rim,
   said seat being above the bottom wall of the pan,
   a tray including a body and a peripheral flange adapted to rest on said seat,
   said body including a first food supporting surface formed of a plurality of discontinuous flats located in the plane of said flange, and a second food supporting surface formed of a plurality of discontinuous flats located in a plane parallel to, and spaced from, the plane of said flange,
   the distance between said planes being greater than the distance between said rim and said seat, whereby said flange may be placed on said seat with said second food supporting surface above, or below, said rim.

References Cited by the Examiner

UNITED STATES PATENTS

| 27,115 | 2/60 | Dunklee | 126—275 |
| 389,602 | 9/88 | Sankey | 99—445 |
| 1,710,433 | 4/29 | Seeley | 126—339 |
| 1,885,325 | 11/32 | Bogley | 99—446 |
| 1,891,394 | 12/32 | Otte | 126—337 |
| 2,214,060 | 9/40 | McCormick | 99—446 |
| 2,502,685 | 4/50 | Warner | 99—421 |
| 2,504,237 | 4/50 | Weissbach | 99—449 |
| 2,821,903 | 2/58 | Allen | 99—421 |
| 2,847,932 | 8/58 | More | 99—446 |
| 2,985,096 | 5/61 | Wolske | 99—421 |

FOREIGN PATENTS

| 1,125,850 | 7/56 | France. |
| 1,141,937 | 3/57 | France. |

ROBERT E. PULFREY, Primary Examiner.

JOSEPH D. BEIN, EUGENE R. CAPOZIO, Examiners.